(12) United States Patent
Moskovich et al.

(10) Patent No.: US 11,232,121 B2
(45) Date of Patent: Jan. 25, 2022

(54) METHOD, APPARATUS, AND COMPUTER-READABLE MEDIUM FOR DATA TRANSFORMATION PIPELINE OPTIMIZATION

(71) Applicant: Informatica LLC, Redwood City, CA (US)

(72) Inventors: Valentin Moskovich, Mountain View, CA (US); Kanika Dhuria, San Mateo, CA (US)

(*) Notice: Subject to any disclaimer, the term of this patent is extended or adjusted under 35 U.S.C. 154(b) by 579 days.

(21) Appl. No.: 16/026,452

(22) Filed: Jul. 3, 2018

(65) Prior Publication Data

US 2020/0012739 A1 Jan. 9, 2020

(51) Int. Cl.
  *G06F 16/25* (2019.01)
(52) U.S. Cl.
  CPC .................. *G06F 16/254* (2019.01)
(58) Field of Classification Search
  CPC .. G06F 16/215; G06F 16/243; G06F 16/3344; G06F 16/90332
  See application file for complete search history.

(56) References Cited

U.S. PATENT DOCUMENTS

| 6,032,147 A * | 2/2000 | Williams | G06F 16/258 |
| 2014/0201273 A1* | 7/2014 | Stern | H04L 63/0428 |
| | | | 709/204 |
| 2019/0095817 A1* | 3/2019 | Ma | G06F 16/951 |

* cited by examiner

*Primary Examiner* — Ken Hoang
(74) *Attorney, Agent, or Firm* — Amardeep S. Grewal; Reed Smith LLP

(57) ABSTRACT

A system, method and computer-readable medium for data transformation pipeline optimization including storing a transformation pipeline comprising data transformation components having associated input buffers and associated output buffers and being configured to apply data transformations to data in the associated input buffers and output results of the data transformations to the associated output buffers, receiving a data set comprising data fields, identifying satellite data fields for at least one transformation component, each satellite data field comprising data that is not utilized during the data transformations of the transformation component, and processing, by the data transformation engine, the data set through each transformation component in the transformation pipeline, the processing including removing satellite data fields from the input buffers, linking the removed satellite data fields to the remaining data in the input buffers, and applying the data transformations to data in input buffers and writing results to output buffers.

19 Claims, 20 Drawing Sheets

| First | Last | Age | Addr | phone |
|-------|---------|-----|--------------------------------|-----------|
| John  | Smith   | 25  | 415 california street, san franciso | 435788665 |
| Scott | Madison | 30  | 7649 madison street, san mateo | 345689324 |
| Jerry | Jones   | 32  | 567 howard street, san franciso | 456378888 |
| Ashle | Richard | 40  | 456 john street, seattle | 358789954 |

METHOD, APPARATUS, AND COMPUTER-READABLE MEDIUM FOR DATA TRANSFORMATION PIPELINE OPTIMIZATION

BACKGROUND

The extract, transform, and load (ETL) is a process in data warehousing that involves extracting data from outside sources, transforming the data in accordance with business needs, and loading the data into a data warehouse. An ETL process typically begins with a user defining a data flow that defines data transformation activities that extract data from, e.g., flat files or relational tables, transform the data, and load the data into a data warehouse, data mart, or staging table.

In the context of a data warehousing, and more generally for managing databases, extract-transform-load (ETL) refers to three separate functions of obtaining, processing, and storing data. The extract function reads data from a specified source database and extracts a desired subset of data. The transform function works with the acquired data—using rules or lookup tables, or creating combinations with other data—to convert it to the desired state as defined by the specific ETL tool. The load function is used to write the resulting data (either all the subset or just the changes) to a destination database.

Various and diverse ETL tools can be used for many purposes, including populating a data warehouse, converting a database of a specific type into a database of another type, or migrating data from one database to another. However, when transforming data, data extracted from source is manipulated and copied multiple times depending on how many transformations/operations are applied over the data. For example, if a transformation stage involved ten separate transformation operations, each operating on a different subset of the data, the entire input data set would need to be copied over and passed through each of the ten transformation operations, even though the majority of the input data set may not be required for each individual transformation operation.

Consequently, improvements are needed in systems for optimizing the number of computation operations (such as memory reads and writes) that are performed when passing data through a data transformation pipeline.

BRIEF DESCRIPTION OF THE DRAWINGS

FIG. 5 illustrates an example input buffer that can be provided to the transformation component in FIG. 3.

DETAILED DESCRIPTION

While methods, apparatuses, and computer-readable media are described herein by way of examples and embodiments, those skilled in the art recognize that methods, apparatuses, and computer-readable media for data transformation pipeline optimization are not limited to the embodiments or drawings described. It should be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "can" is used in a permissive sense (i.e., meaning having the potential to) rather than the mandatory sense (i.e., meaning must). Similarly, the words "include," "including," and "includes" mean including, but not limited to.

As discussed above, improvements are needed in systems for optimizing the number of computation operations (such as memory reads and writes) that are performed when passing data through a data transformation pipeline. Applicant has discovered novel methods, apparatuses, and computer-readable media that increase data throughput through a data transformation pipeline, thereby increasing the speed at which data is transported and processed and decreasing the computational costs associated with the transformation stage of an ETL operation.

As discussed in greater detail below, the described methods, apparatuses, and computer-readable media include are configured to partition data at each transformation within a transformation pipeline into data that is required for that transformation and satellite data that is not required for that transformation. The described methods, apparatuses, and computer-readable media include techniques for automatic detection of satellite data for each transformation in a transformation pipeline. The detected satellite data is then removed from the transformation process, which reduces the amount of information that is required to be copied between memory components (such as buffers) within a transformation pipeline. The described methods, apparatuses, and computer-readable media accomplish this without losing any required information, as a link is maintained between records in the data and removed satellite data, so that the output of a transformation can subsequently be patched with the removed data.

Figure 1:
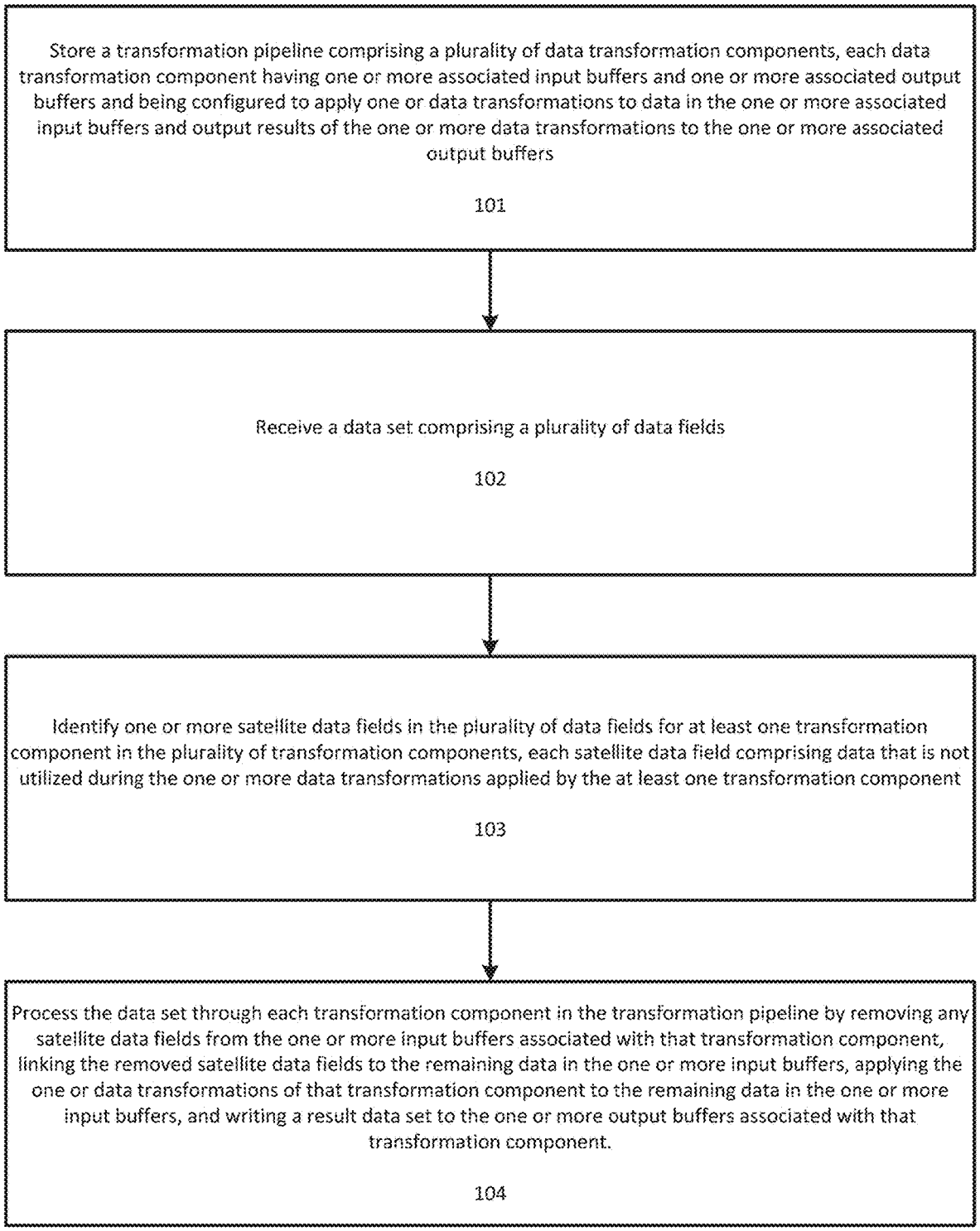
FIG. 1 illustrates a flowchart for data transformation pipeline optimization according to an exemplary embodiment.

FIG. 1 illustrates a flowchart for data transformation pipeline optimization according to an exemplary embodiment. The process shown in FIG. 1 can be executed by a data transformation engine executing on one or more computing devices, such as one or more transformation servers which receive an input from a data extraction process.

At step 101 the data transformation engine stores a transformation pipeline comprising a plurality of data transformation components, with each data transformation component having one or more associated input buffers and one or more associated output buffers and being configured to apply one or data transformations to data in the one or more associated input buffers and output results of the one or more data transformations to the one or more associated output buffers. As used herein, the term "buffer" refers to any type of storage or memory used for staging input to a transformation component or receiving output from a transformation component. This can include a location within memory where data is stored prior to being input to a particular transformation. The buffers can be implemented within random access memory (RAM), a hard disk, flash memory, or any other type of storage format.

Figure 2:
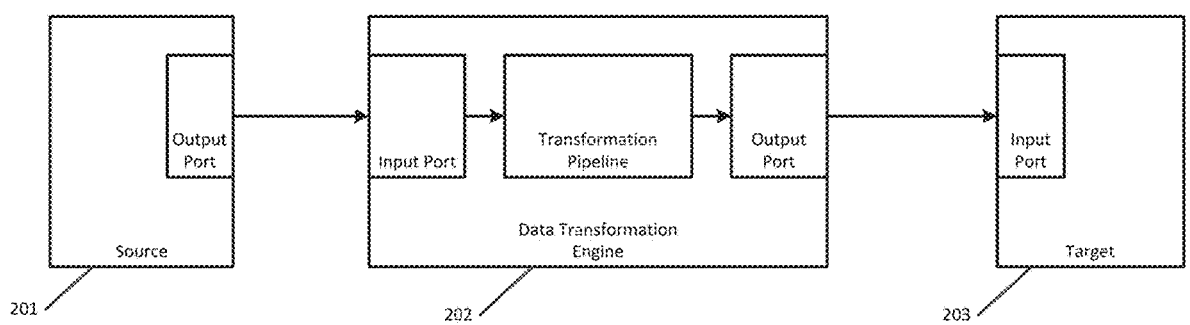
FIG. 2 illustrates a diagram showing the processing of data through the data transformation engine according to an exemplary embodiment.

FIG. 2 illustrates a diagram showing the processing of data through the data transformation engine according to an exemplary embodiment. As shown in FIG. 2, data is passed from an output port of a source 201 to the input port of the data transformation engine 202. The data then passes through the transformation pipeline to an output port, where it is passed to an input port of a target 203. Source 201 and target 203 can be certain memory location within a computing device, separate computing devices, or processes that are configured to provide data to or receive data from the data transformation engine 202.

The transformation pipeline can be formed using a distributed architecture that packages source code such that the responsibility is distributed to smaller units (e.g., components) of source code. Each one of these transformation components can be responsible for one specific type of transformation. The transformation components can be provided by a developer (e.g., from a monolithic transformation application) or can be user-developed. These transformation components form a base of ready-made elements that are combined to build functionally more sophisticated transformations in the data transportation process.

The transformation components are then coupled together to form the pipeline structure. Further information regarding the use of coupled transformation components to form pipelines is described in the U.S. patent application entitled "Method and Architecture for Automated Optimization of ETL Throughput in Data Warehousing Applications," with Ser. No. 09/116,426 and filing date Jul. 15, 1998, issued as U.S. Pat. No. 6,208,990, the disclosure of which is hereby incorporated by reference in its entirety.

The transformation pipeline defines the data flow starting from the source and ending in target. Each transformation component has input data that it receives and output data that it outputs to a next transformation component or to a target (if there are no other transformation components). The intermediate data between the transformation components is stored in memory (referred to as "buffers") or staged before it can be passed to the next transformation component for processing.

A user can utilize a transformation descriptive language with a graphical user interface (GUI) to instruct the data transformation engine on how to route data between transformation components in the data transformation engine. This transformation descriptive language can enable the user to develop a complex end-to-end data transformation function by graphically describing and representing a desired data flow from one or more sources to one or more destinations through various interconnected transformations. A mapping can be used for directing the data flow between the I/O ports corresponding to the sources, the plurality of transformation objects, and the targets. The mapping specifies the connectivity between the sources, transformation, and target objects as well as the order of these connections.

Figure 3:
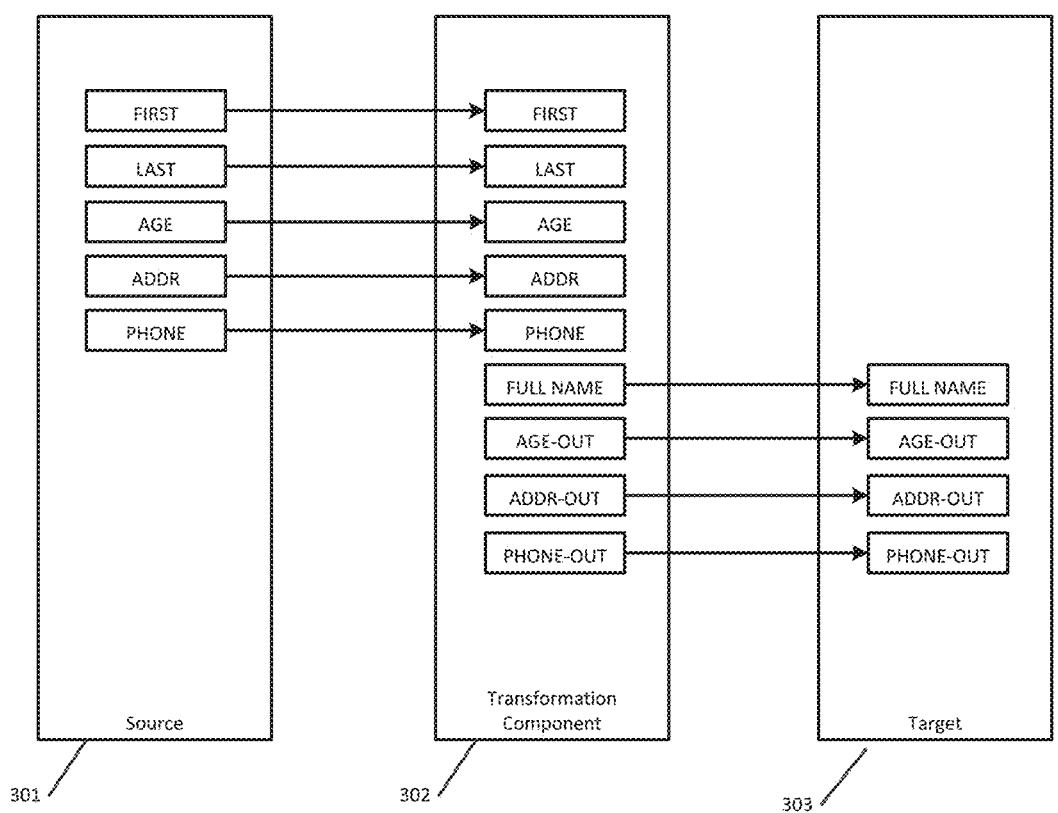
FIG. 3 illustrates the data flow between a source, transformation component, and target without satellite data removal.

FIG. 3 illustrates the data flow between a source 301, transformation component 302, and target 303 without satellite data removal. As shown in FIG. 3, the source data includes fields FIRST (corresponding to a first name), LAST (corresponding to a last name), AGE, ADDR (address), and PHONE. The fields can correspond to, for example, columns within a table or data set. These fields are mapped to ports within the transformation component 302 which, in this case, concatenates the first and last names into the FULL NAME field and outputs the concatenation, along with the remaining fields to the target. The links between the fields in the source 301, transformation component 302, and target 303 represent mappings between input and output ports. While the input and output buffers are not shown in this figure, it is understood that an input buffer would stage the input data received by the transformation component 302 and an output buffer would receive the output of the transformation component 302.

Some transformations like aggregator or joiner can require the input data to be shuffled to process efficiently, and this processing can be performed by the data transformation engine. The transformation engine can also be configured to perform any additional processing or rearrangement of the data as required in order to enable the processing of the data by the transformation components.

The transformations performed by each of the transformation components can include, for example, a sort transformation, a concatenation transformation, a merge transformation, a join transformation, an aggregator transformation, an expression transformation, a filter transformation, a lookup transformation, a query transformation, a sequence transformation, a stored procedure transformation, an update strategy transformation, and/or a union transformation.

The input data set can be organized in any format, including structured or semi-structured data, as long as the data set include one or more fields or domains and data corresponding to the one or more fields or domains. For example, the input data set can be structured in rows or columns with fields being indicated by columns and can be formatted in a row-oriented or column-oriented (columnar) format. The input data set can also be semi-structured data, such as with (field, value) pairings embedded in unstructured data.

When the input data is organized in a row and column format, the input/output of a transformation in database terms can be considered as set of columns, together representing a row. The size of the row is the sum of size of all the columns. The cost of the computation and the resource is then directly proportional to the size of row. However, depending upon the logic of the transformation (whether streaming or staging) the whole row data doesn't need to be copied/processed or shuffled. As will be discussed further below, the input and output data can be partitioned in such a way the transformation component only sees the data that is necessary for processing or transformation the data. The unnecessary data for each transformation component (referred to as "satellite data") can then be removed from the input buffer for each transformation component, as discussed further below.

Figure 4:
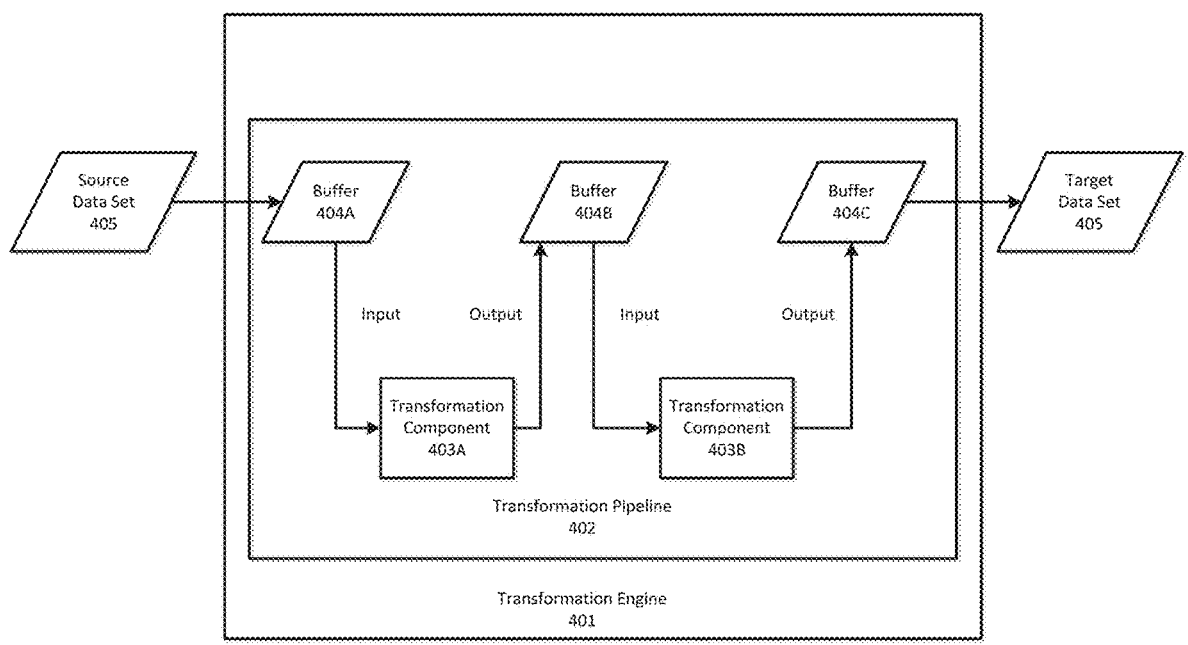
FIG. 4 illustrates the flow of data through a transformation pipeline of transformation engine that includes multiple transformation components according to an exemplary embodiment.

FIG. 4 illustrates the flow of data through a transformation pipeline 402 of transformation engine 401 that includes multiple transformation components according to an exemplary embodiment. As shown in FIG. 4, the source data set 405 (which can received or retrieved from a remote source or database) is first provided to buffer 404A, which acts as input buffer to transformation component 403A. The output of transformation component 403A is then provided to buffer 404B, which acts as an output buffer for transformation component 403A and an input buffer for transformation component 403B. Finally, the output of transformation component 403B is provided to buffer 404C, which acts as the output buffer for that transformation component, and transmitted out of the transformation engine 401 as the target data set 405.

As shown above, the transformation components, each of which has defined inputs and outputs, manipulate their input buffer and generate an output buffer for the input of the next transformation in the pipeline. For example, in the single transformation pipeline shown in FIG. 3, the data is extracted from a source which has first and last names as two separate fields, the data is transformed by an expression to concatenate the first and last name to generate the full name, and the target is loaded with the transformed data.

FIG. 5 illustrates an example input buffer 500 that could be provided to the transformation component 302 in FIG. 3. Buffer 500 has data arranged by the records and includes fields for first and last name, which are used by the transformation component to perform the concatenation transformation. However, the buffer also passes along data in the other fields/columns, including age, address and phone number, which are not used by the transformation component. As explained in greater detail below, these fields can be skipped when moving data through various transformation components, hence reducing the overall memory/storage usage of the data transformation engine.

Returning to FIG. 1, at step 102 a data set comprising a plurality of data fields is received by the data transformation engine. As discussed earlier, the input data set can be organized in any format. For example, the input data set can be organized in a columnar format with each data field in the plurality of data fields corresponding to a column in a plurality of columns.

Additionally, the data set can be received by the data transformation engine from multiple sources, with the resulting output also being transmitted to multiple targets or destinations.

Figure 6:
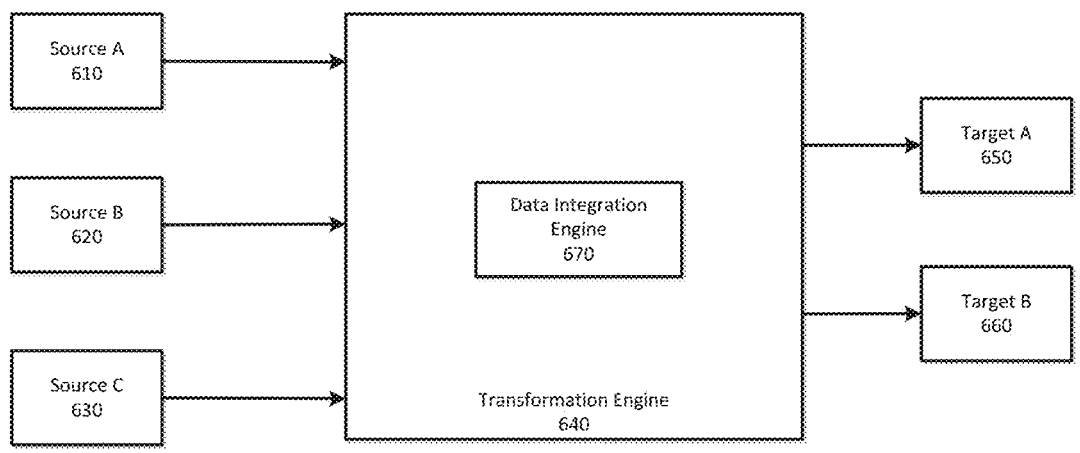
FIG. 6 illustrates an exemplary data warehouse architecture in which the transformation engine can be implemented according to an exemplary embodiment.

FIG. 6 illustrates an exemplary data warehouse architecture in which the transformation engine can be implemented according to an exemplary embodiment. Operational databases 610, 620, and 630 (sources A, B and C, respectively) can store data resulting from business and financial transactions, and/or from equipment performance logs. These databases can be any of the conventional Relational Database Management Systems (RDBMS) (such as from Oracle, Informix, Sybase, Microsoft, etc.) that reside within a high capacity mass storage device (such as hard disk drives, optical drives, tape drives, etc.). Databases 650 and 660 (targets A and B, respectively) can be the data warehouses or data marts that are the targets of the data transportation process.

Data integration engine 670 is a functional element that can be implemented in software and/or hardware for performing data transport operations. The data integration engine 670 can a software program, operable on the transformation engine 640 that performs data transport operations. That is, data from databases 610, 620, and 630 can be extracted, transformed, and loaded by transformation engine 640 into databases 650 and 660.

Transformation engine 640 can include multiple microprocessors which run an operating system program (such as Windows NT, UNIX, etc.). Data integration engine 670 can extract data from source databases 610, 620, and 630 and store the extracted source data, when storage is required, in the memory storage of transformation engine 640.

Various transformations can be part of the pipeline defined by the end-user. The transformation engine 640 can include various transformation components, each of which has defined inputs and outputs from which the user can graphically construct complex data transformations. As explained above, data extracted from the sources 610, 620, and 630 moves through various transformations in a transformation pipeline of the transformation engine 640 in buffers. The various transformations process and manipulate the data in these buffers and the transformation engine 640 eventually writes the output to targets 650 and 660. The transformation engine manages and uses storage to move the data between various transformation components, optimizing on the resources.

Returning to FIG. 1, at step 103 one or more satellite data fields in the plurality of data fields for at least one transformation component in the plurality of transformation components are identified by the transformation engine. As discussed previously, each satellite data field comprises data that is not utilized during the one or more data transformations applied by the at least one transformation component.

Satellite data for each transformation is detected automatically without human intervention. The input and output of each transformation component which is responsible for a specific type of transformation is utilized to detect the satellite data. A relationship between the input and output columns is established using the transformation source code and the satellite data is detected by scrutinizing this relationship.

For example, FIG. 3, involves a transformation which converts the input row of (first name, last name, age, address, phone) to (name (first name last name), age, address, phone). The relationship is derived from the inputs and outputs as:

Full name output=f(first name input, last name input), where f is the concatenation function;
Age output=age input;
Address output=address input; and
Phone output=phone input;

Age, address and phone input and output columns are called pass through columns where there is no function that is applied on input column to produce the output. The pass-through columns are detected by finding the function when applied on input field(s) to produce output field. If the output field=f(input field) when f is identity function and the fields are not part of transformation logic (i.e. the fields are not necessary for the transformation logic), then output field is a pass-through field. This relationship is a factor of the transformation type and is detected by looking at the configuration for the transformation defined by the end user. The satellite data is identified for each transformation in the pipeline.

Each transformation component can take input from more than one prior transformation component (i.e., can have more than one input group) and can also output results to more than one subsequent transformation component (i.e., can have more than one output group). For example, transformations like join and union merge the data from multiple pipelines and are considered multi-input group. Similarly, there are transformations which split the data into multiple pipelines, such as routing transformations.

When there is more than one input group (which can be a prior transformation component or data source) or more than one output group (which can be a subsequent transformation component or data target), it is necessary to identify satellite data for each pair of (input group, output group).

Figure 7:
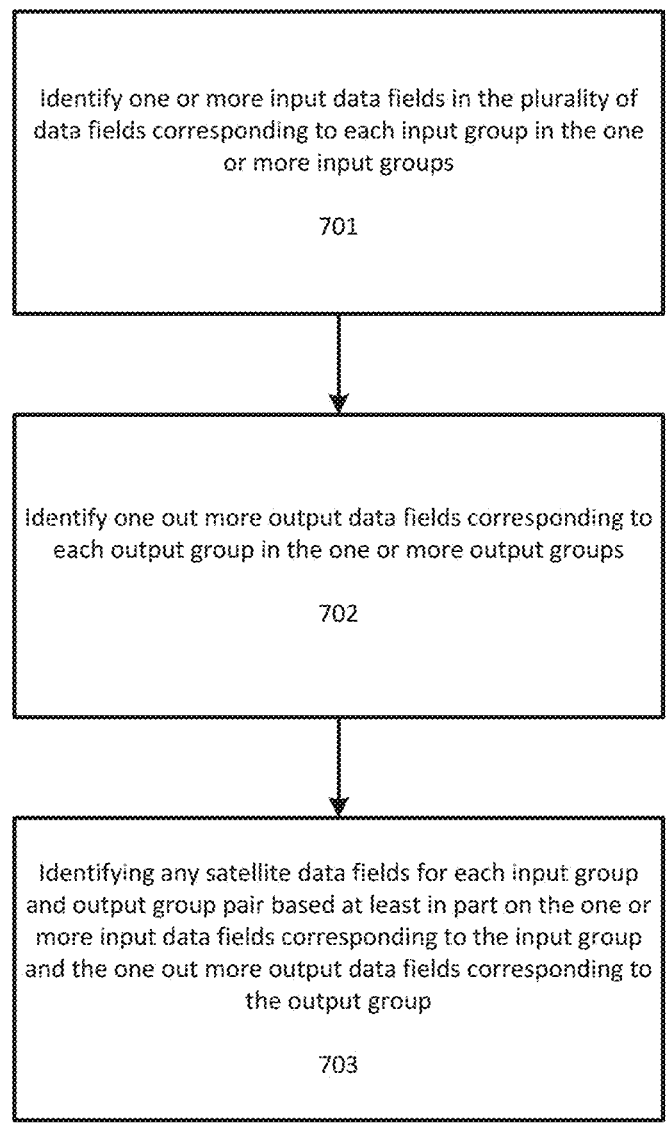
FIG. 7 illustrates a flowchart for identifying, by the transformation engine, one or more satellite data fields in the plurality of data fields for at least one transformation component in the plurality of transformation components according to an exemplary embodiment.

FIG. 7 illustrates a flowchart for identifying, by the transformation engine, one or more satellite data fields in the plurality of data fields for at least one transformation component in the plurality of transformation components according to an exemplary embodiment. The steps shown in FIG. 7 are repeated for each transformation component in the transformation pipeline. Additionally, as discussed above, data fields in the plurality of data fields can be input to each transformation component as one or more distinct input groups and each transformation component can produce one or more distinct output groups.

At step 701 one or more input data fields in the plurality of data fields corresponding to each input group in the one or more input groups are identified by the transformation engine. At step 702 one out more output data fields corresponding to each output group in the one or more output groups are identified by the transformation engine. At step 703 any satellite data fields for each input group and output group pair are identified by the transformation engine based at least in part on the one or more input data fields corresponding to the input group and the one out more output data fields corresponding to the output group. When there is only a single input group and a single output group, then there will only be a single input group and output group pair and step 703 will only be executed once for that transformation component. Otherwise, step 703 is executed for each input group and output group pair.

Figure 8A:
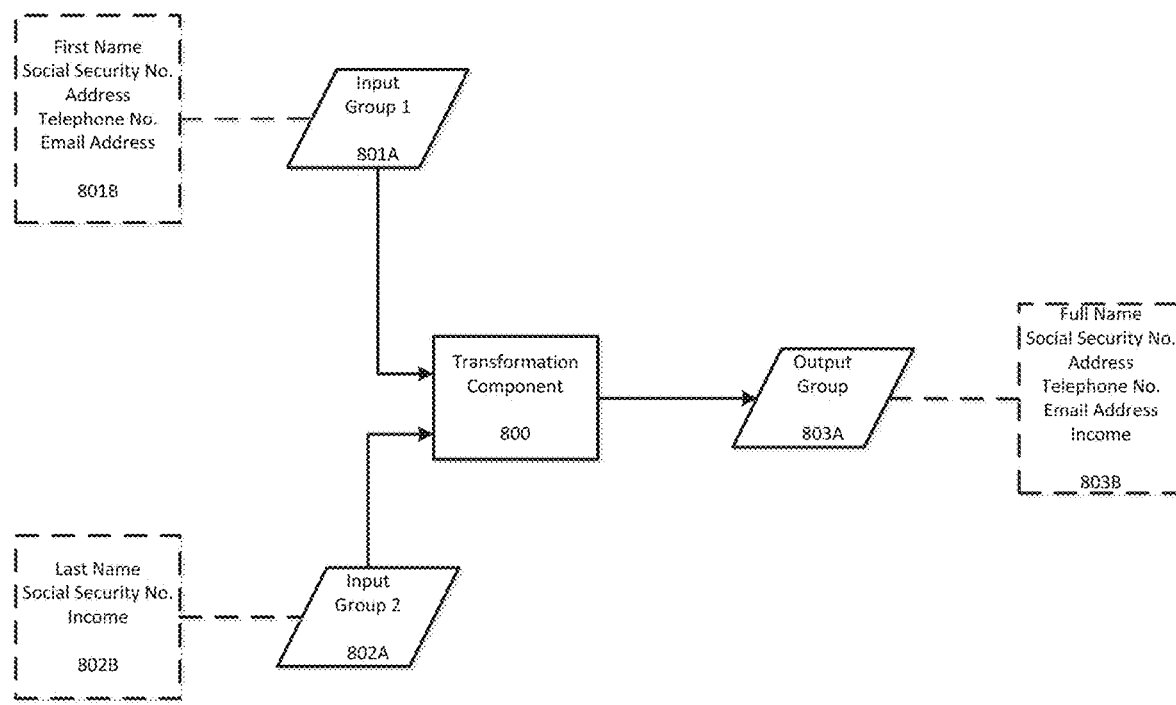
FIGS. 8A-8B illustrate an example of identifying one or more satellite data fields in the plurality of data fields for at least one transformation component in the plurality of transformation components according to an exemplary embodiment.
Figure 8B:
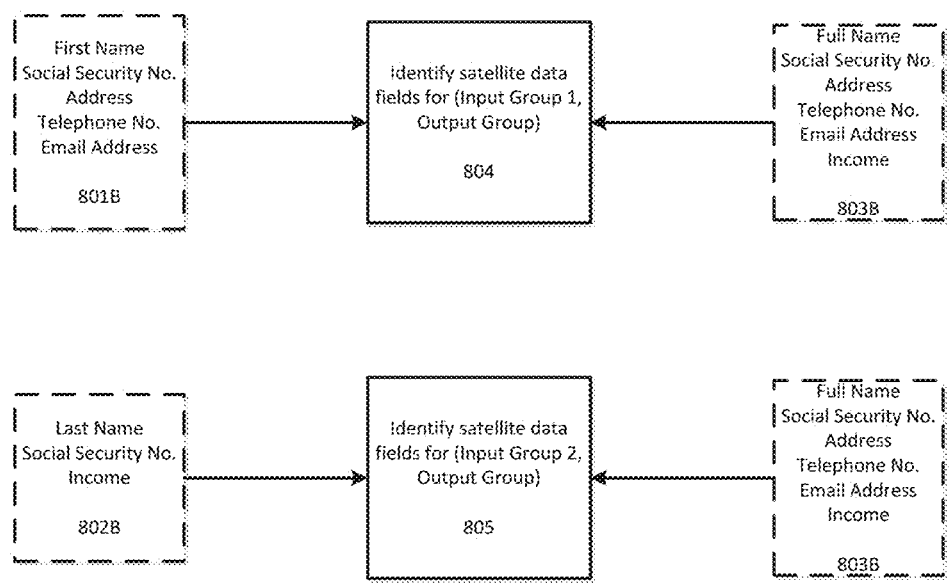

FIGS. 8A-8B illustrate an example of identifying one or more satellite data fields in the plurality of data fields for at least one transformation component in the plurality of transformation components according to an exemplary embodiment.

As shown in FIG. 8A, transformation component 800 takes input from two input groups, 801A and 802A. Input group 801A includes the fields shown in box 801B {First Name, Social Security No., Address, Telephone No., and Email Address} and input group 802A includes the fields shown in box 802B {Last Name, Social Security No., and Income}. In this example, the transformation component 800 concatenates the values in the First Name field from input group 1 801A with the Last Name field from input group 2 802A using the value in the Social Security No. field to identify matching rows. The values in the remaining fields for both input groups are passed through unchanged. The result of this transformation is output in the output group 803A, which includes the fields shown in box 803B {Full Name, Social Security No., Address, Telephone No., Email Address, and Income}

FIG. 8B shows the processing performed to identify satellite data fields for the input groups and output group shown in FIG. 8A. As shown in FIG. 8B, at step 804 the fields corresponding to the first input group 801B and the fields corresponding to the output group are used to identify satellite data fields for that pair of input and output groups. Similarly, at step 805 the fields corresponding to the second input group 802B and the fields corresponding to the output group are used to identify satellite data fields for that pair of input and output groups.

Figure 9:
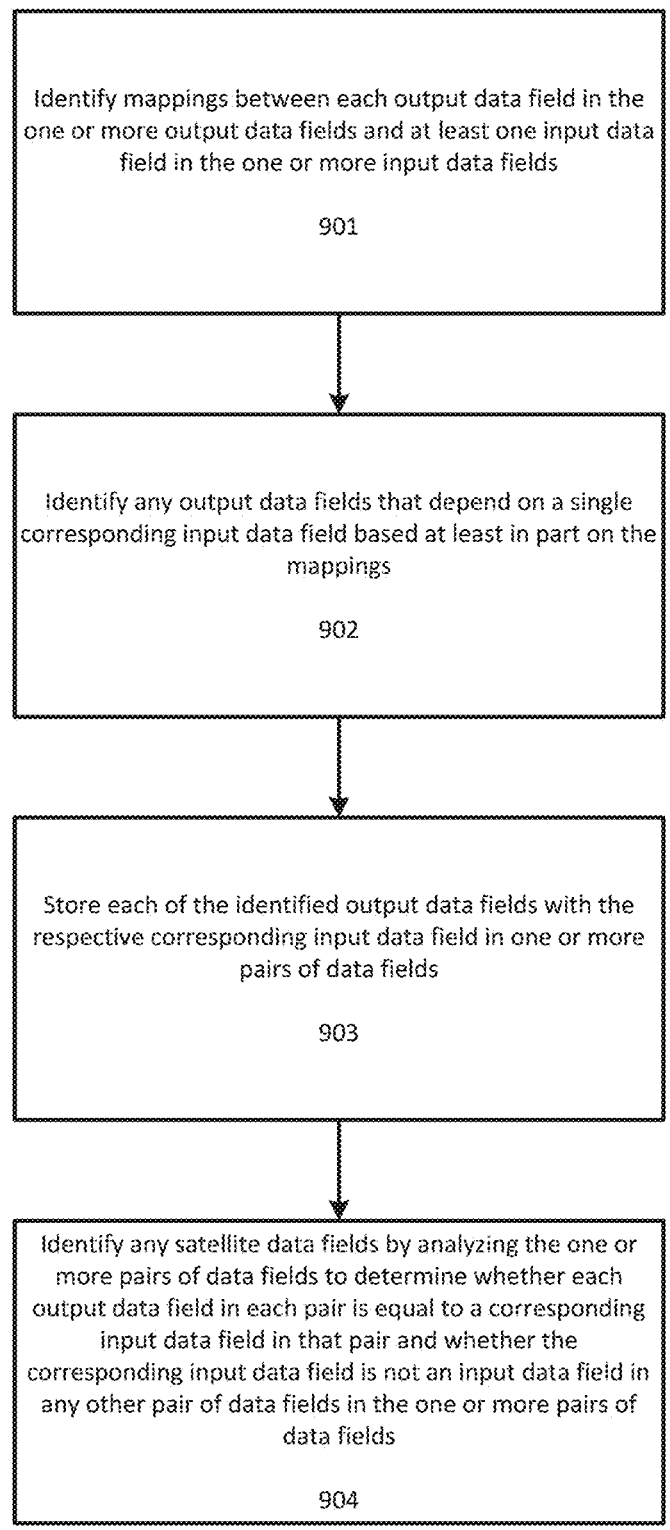
FIG. 9 illustrates a flowchart for identifying any satellite data fields for each input group and output group pair based at least in part on the one or more input data fields corresponding to the input group and the one out more output data fields corresponding to the output group according to an exemplary embodiment.

FIG. 9 illustrates a flowchart for identifying any satellite data fields for each input group and output group pair based at least in part on the one or more input data fields corresponding to the input group and the one out more output data fields corresponding to the output group according to an exemplary embodiment. The steps shown in this flowchart correspond step 703 of FIG. 7.

At step 901 mappings between each output data field in the one or more output data fields and at least one input data field in the one or more input data fields are identified. The transformation engine includes various transformation components. Transformation components are based on the set of callable handlers that the engine calls in to process data. For example, the engine is responsible for buffer/memory managements and the transformation component is called in to perform the transformation operation on the buffers as input and outputs the buffer(s). The transformation component also provides important information to the engine to optimize the pipeline. When identifying mappings, the transformation engine calls the transformation component to detect the mapping between the output and input fields. Transformations implement the handler which provide how the output fields can be expressed in terms of input fields. The transformation engine invokes this handler implementation of the transformation component to identify mappings and subsequently detect satellite data. The handler also provides information useful for determining whether the field can be safely removed from the transformation pipeline for the transformation logic without affecting the transformation.

At step 902 any output data fields that depend on a single corresponding input data field are identified based at least in part on the mappings. Note that multiple output fields can depend on the same input field.

At step 903 each of the identified output data fields are stored with the respective corresponding input data field in one or more pairs of data fields. The structure of these pairs is (input field, output field).

At step 904 satellite data fields are identified by analyzing the one or more pairs of data fields to determine whether each output data field in each pair is equal to a corresponding input data field in that pair and whether the corresponding input data field is not an input data field in any other pair of data fields in the one or more pairs of data fields. More specifically, this step detects the fields from the pairs that are not necessary for the transformation. In order to be identified as a satellite data field, an input field in a particular pair should not be paired with any other output field(s) besides as pass through value (i.e., the input field value equals the output field value). In other words, an (input X, output Y) pair is pass through if and only if Output Y=Input X and Input X is not used in any other output where the output=non-identity function (Input X).

Figure 10A:
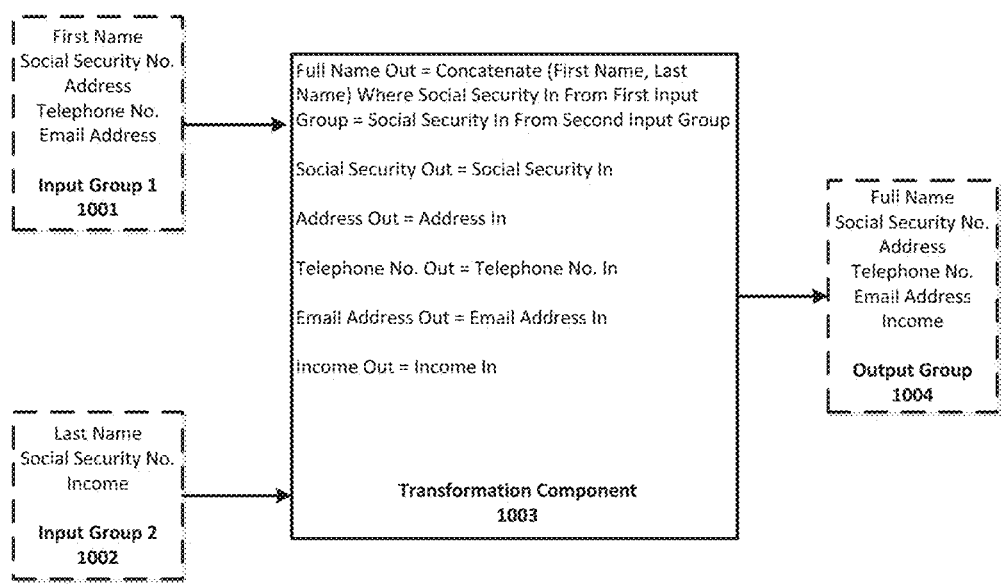
FIGS. 10A-10C illustrate an example of the satellite field detection process according to an exemplary embodiment.
Figure 10B:
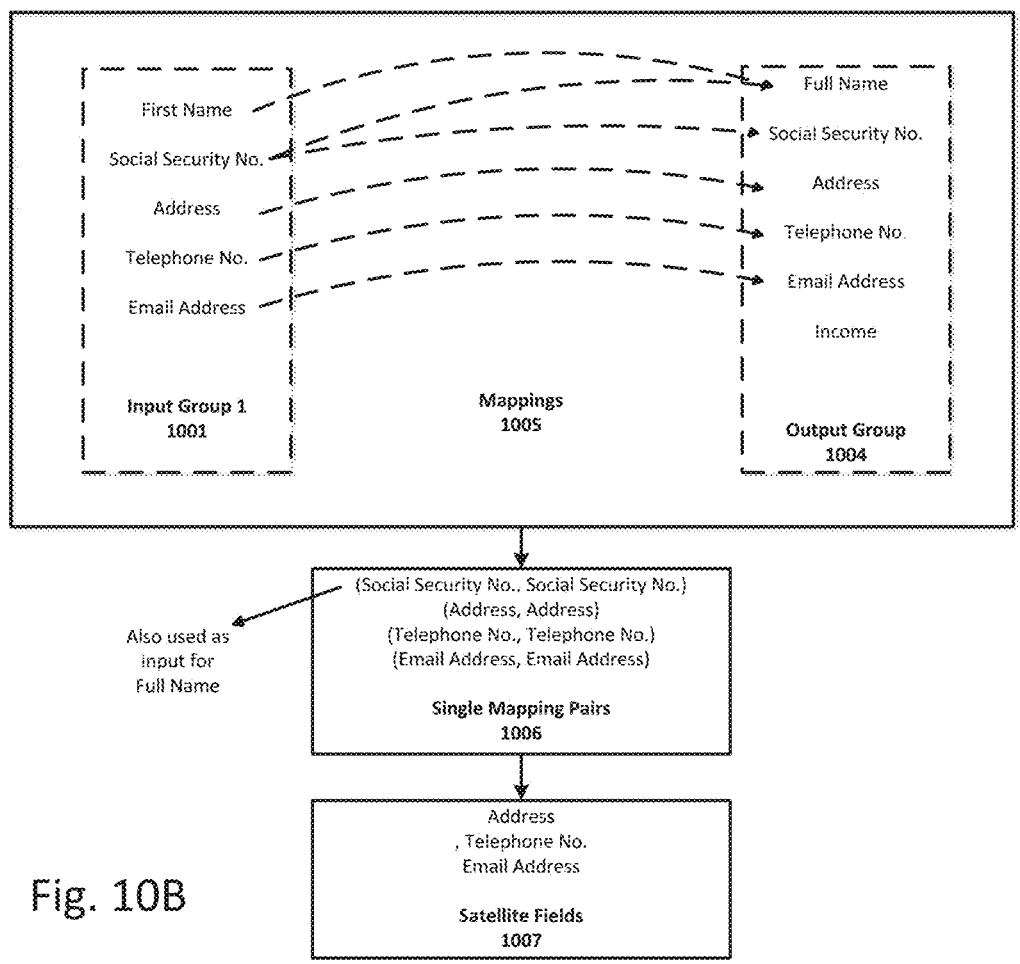
Figure 10C:
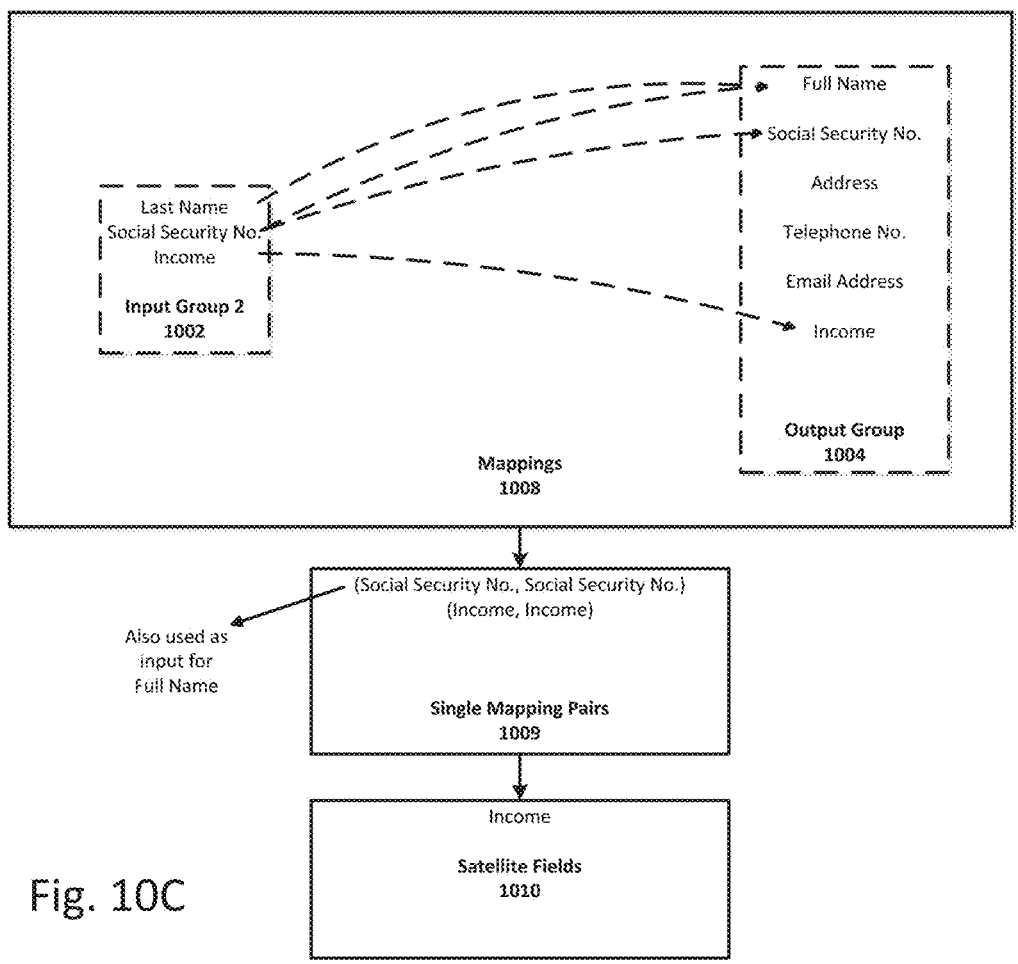

FIGS. 10A-10C illustrate an example of the satellite field detection process according to an exemplary embodiment. FIG. 10A illustrates the two input groups, Input Group 1 1001 and Input Group 2 1002 that are input to a transformation component 1003 to create the Output Group 1004. As shown in FIG. 10A, the transformation component uses the social security no. field common to both input groups to concatenate the first name field in Input Group 1 1001 with the last name field in Input Group 2 1002.

FIG. 10B illustrates the satellite field detection process for the pair (Input Group 1, Output Group). As shown in FIG. 10B mappings 1005 are first identified between Input Group 1 1001 and Output Group 1004. All output fields with the exception of "Full Name" depend on only a single input field. As discussed above, "Full Name" depends on both the "First Name" field and the "Social Security No." field in Input Group 1 1001.

All single mapping pairs are shown in box 1006 of FIG. 10B. The single mapping pairs include all output fields that depend only on a single input field. This includes (Social Security No., Social Security No.), (Address, Address), (Telephone No., Telephone No.), and (Email Address, Email Address).

The (Social Security No., Social Security No.) pair is removed from this set because the "Social Security No." field in Input Group 1 1001 is also an input to the "Full Name" field in Output Group 1004 (and not as a pass through field), resulting in the final list of satellite fields shown in box 1007 (Address, Telephone No., and Email Address).

FIG. 10C illustrates the satellite field detection process for the pair (Input Group 2, Output Group). As shown in FIG. 10C mappings 1008 are first identified between Input Group 2 1002 and Output Group 1004. All output fields with the exception of "Last Name" depend on only a single input field. As discussed previously, "Full Name" depends on both the "Last Name" field and the "Social Security No." field in Input Group 2 1002.

All single mapping pairs are shown in box 1009 of FIG. 10C. The single mapping pairs include all output fields that depend only on a single input field. This includes (Social Security No., Social Security No.) and (Income, Income).

The (Social Security No., Social Security No.) pair is removed from this set because the "Social Security No." field in Input Group 2 1002 is also an input to the "Full Name" field in Output Group 1004 (and not as a pass through field), resulting in the final list of satellite fields shown in box 1010 (Income).

Returning to FIG. 1, at step 104 the transformation engine processes the data set through each transformation component in the transformation pipeline by removing any satellite data fields from the one or more input buffers associated with that transformation component, linking the removed satellite data fields to the remaining data in the one or more input buffers, applying the one or data transformations of that transformation component to remaining data in the one or more input buffers and writing a result data set to the one or more output buffers associated with that transformation component.

Figure 11:
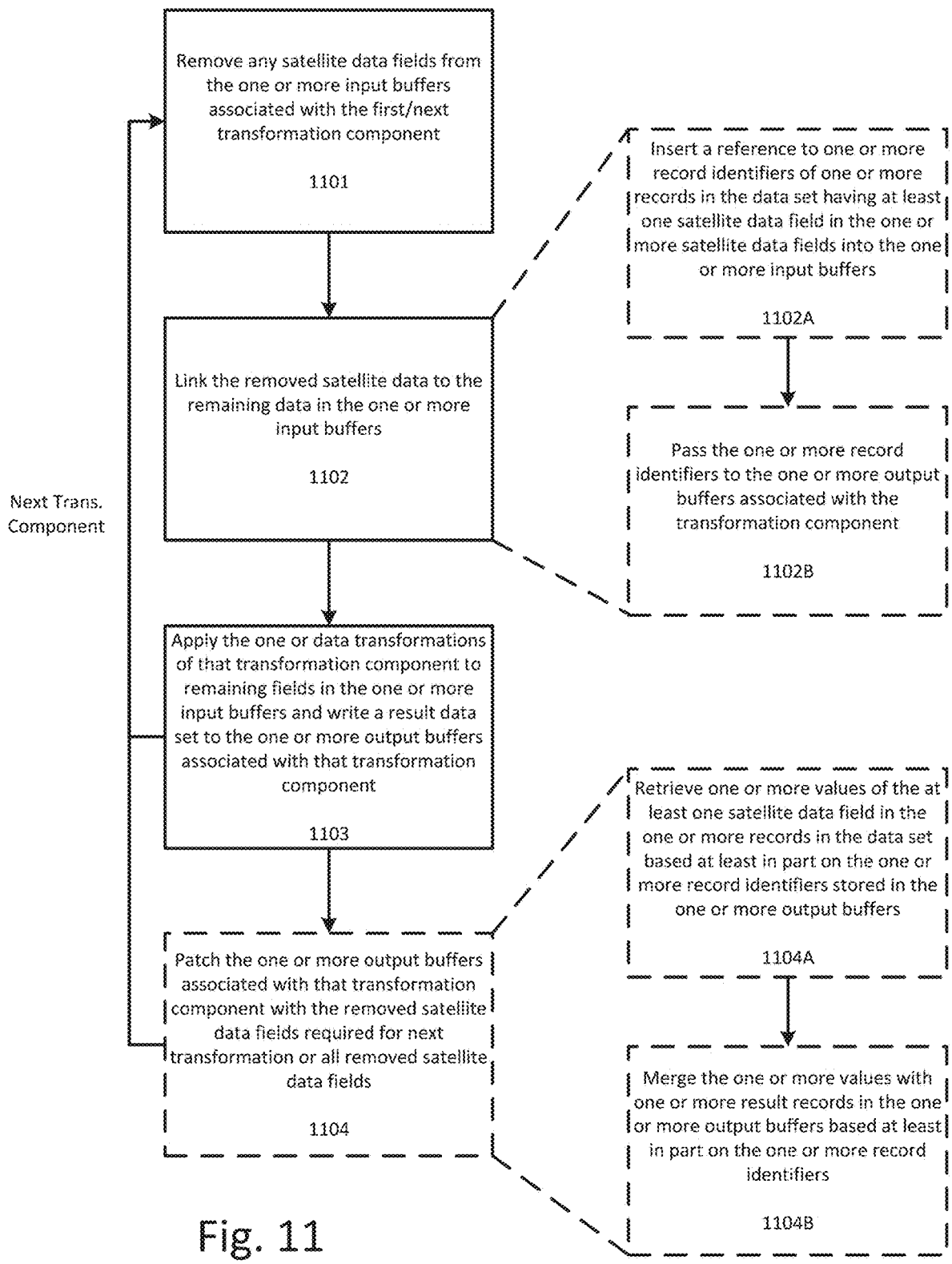
FIG. 11 illustrates a flowchart for processing the data set through each transformation component in the transformation pipeline according to an exemplary embodiment.

FIG. 11 illustrates a flowchart for processing the data set through each transformation component in the transformation pipeline according to an exemplary embodiment.

At step 1101 any data associated with any satellite data fields are removed from the one or more input buffers associated with that transformation component. This results in the elimination of a large portion of data copy/transfer operations from the data processing through the transformation pipeline, thereby reducing required computational resources and increasing throughput of the data transport process.

At step 1102 the removed satellite data is linked to the remaining data in the one or more input buffers. This process can include sub-steps 1102A and 1102B. At sub-step 1102A a reference to one or more record identifiers of one or more records in the data set having at least one satellite data field in the one or more satellite data fields is inserted into the one or more input buffers. At sub-step 1102B the one or more record identifiers are passed to the one or more output buffers associated with that transformation component. Sub-step 1102B can be performed by passing the record identifiers through the transformation component. As discussed with respect to step 1104, the record identifiers can subsequently be utilized to patch the output buffer of the transformation component to replace the removed data in case it is required by the subsequent transformation component. Of course, the removed satellite data can be linked to the remaining data in a variety of different ways. For example, a separate data structure associated with each transformation component can track satellite data fields and corresponding record identifiers.

At step 1103 the one or data transformations of that transformation component are applied to remaining data in the one or more input buffers and a result data set is written to the one or more output buffers associated with that transformation component.

After step 1103, a look-ahead check can be performed to determine whether all of the fields required for the subsequent transformation components are present within the fields of the result data set or if the current transformation component is the last transformation component in the transformation pipeline.

If the current transformation component is not the last transformation component and the next transformation component does not require any fields that are not already in the result data set, then the process can proceed to the next transformation component, with at least steps 1101-1103 repeating for the next transformation component.

Otherwise, at step 1104, the one or more output buffers associated with that transformation component are patched with either any removed satellite data fields required for the next transformation component in the transformation pipeline (when there is a subsequent transformation component) or with all removed satellite data fields (when there are no remaining transformation components in the transformation pipeline). Optionally, this patching process can be performed automatically after every transformation component without performing any look-ahead checks.

Step 1104 can include sub-steps 1104A and 1104B. At sub-step 1104A one or more values of at least one satellite data field in the one or more satellite data fields in one or more records in the data set are retrieved based at least in part on one or more record identifiers stored in the one or more output buffers. At sub-step 1104B the one or more values are merged with one or more result records in the one or more output buffers based at least in part on the one or more record identifiers.

After step 1104, if there are additional transformation components, then the process moves to the subsequent transformation component and proceeds again from step 1101. Otherwise, the result data set is transmitted/written to the target by the data transformation engine.

Figure 12A:
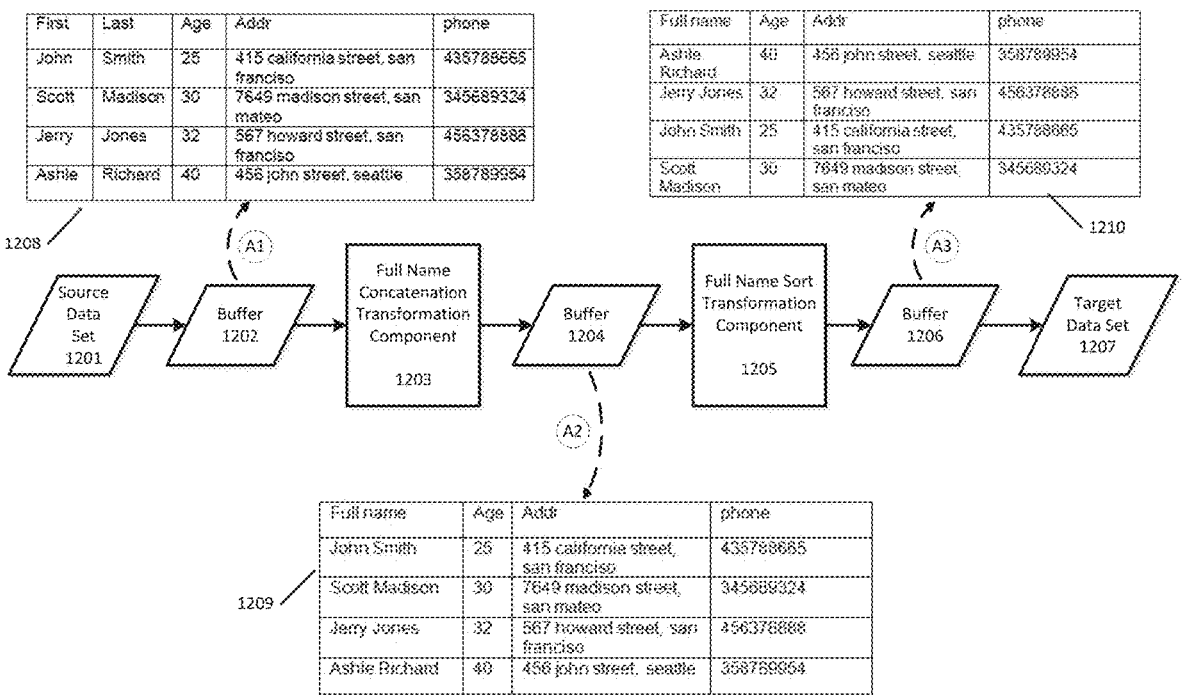
FIG. 12A illustrates an example of a data transformation pipeline performing data transformations on an input data set without removal of satellite data.
Figure 12B:
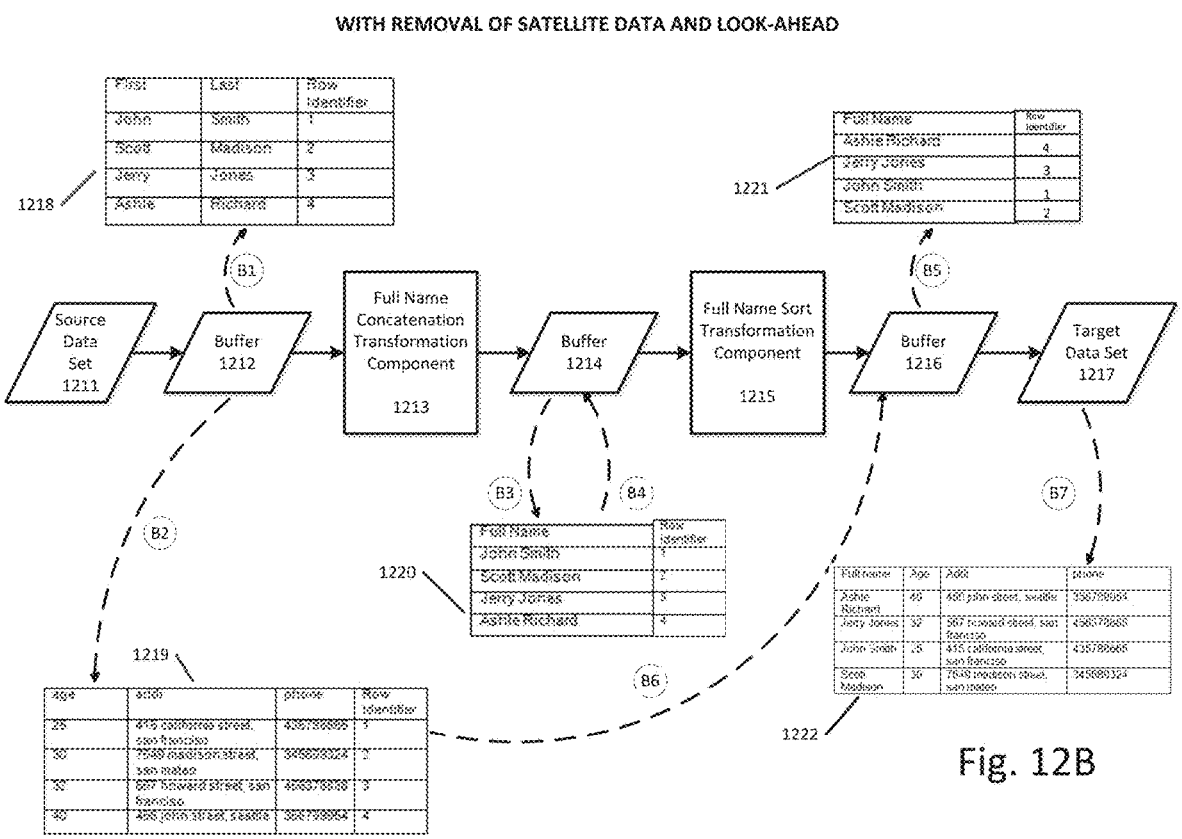
FIG. 12B illustrates an example of a data transformation pipeline performing data transformations on an input data set with removal of satellite data and using look-ahead processing to determine whether to patch an output buffer according to an exemplary embodiment.
Figure 12C:
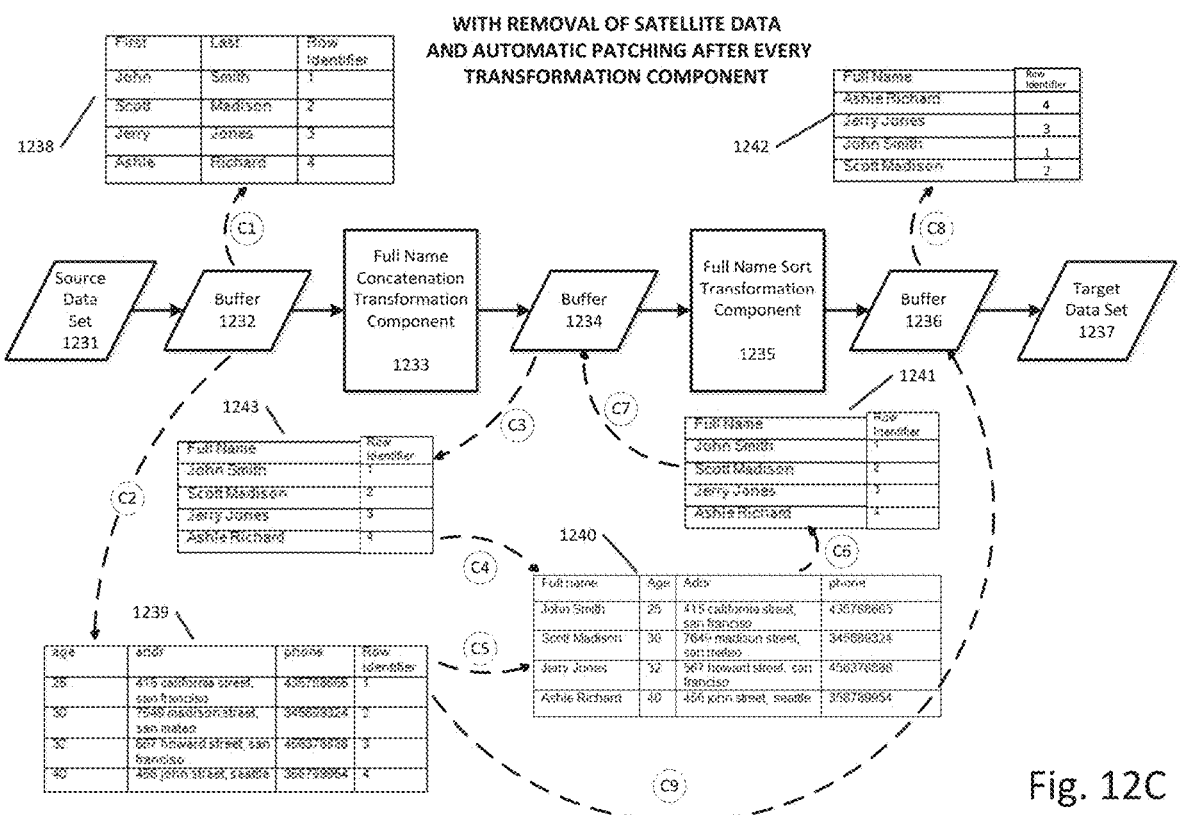
FIG. 12C illustrates an example of a data transformation pipeline performing data transformations on an input data set with removal of satellite data and patching of output buffers after each transformation component according to an exemplary embodiment.

The above-described processes are explained further with respect to example shown in FIGS. 12A-12C. FIG. 12A illustrates an example of a data transformation pipeline performing data transformations on an input data set without removal of satellite data according to an exemplary embodiment.

As shown in FIG. 12A, a source data set 1201 is first passed to buffer 1202, which is the input buffer to a full name concatenation transformation component 1203. Dashed arrow A1 indicates the table 1208 that is stored in buffer 1202 at this point in the processing. As shown in table 1208, the data set includes the fields First Name, Last Name, Age, Address, and Phone Number.

This data is then passed to the full name concatenation transformation 1203, which performs the concatenation transformation on the First Name and Last Name fields and outputs the results to output buffer 1204. Dashed arrow A2 indicates the table 1209 that is stored in buffer 1204 at this time.

Buffer 1204 acts as an input buffer to a second transformation component, the full name sort transformation component 1205. As indicated by the name, this transformation component 1205 sorts all data in the input data set by the "full name" field. The result of this transformation component 1205 is then passed to output buffer 1206, the contents of which are indicated by dashed arrow A3 pointing to table 1210. The data in buffer 1206 is then written/transmitted to the target data set 1207.

FIG. 12B illustrates an example of a data transformation pipeline performing data transformations on an input data set with removal of satellite data and using look-ahead processing to determine whether to patch an output buffer according to an exemplary embodiment.

As shown in FIG. 12B, a source data set 1211 is first passed to buffer 1212, which is the input buffer to a full name concatenation transformation component 1213. Source data set 1211 is initially identical to source data set 1201 in FIG. 12A. At this point, the satellite data fields corresponding to the full name concatenation transformation component 1213 are identified and removed from the buffer 1212 and replaced with a row identifier that links to the data in the removed satellite fields. This process is performed as described earlier in the specification with respect to FIGS. 1 and 7-11.

Dashed arrow B1 indicates the table 1208 that is stored in buffer 1202 at this point in the processing. As shown in table 1208, the only remaining fields (aside from the added row identifier) are the first name and last name fields, both required for the transformation performed by transformation component 1213. Additionally, dashed arrow B2 indicates the satellite data 1219 that has been removed from buffer 1212. The satellite data 1219 can be stored or maintained anywhere in memory, along with row identifiers that allow for subsequent merging with data in the output buffer 1214 after processing of the remaining data in buffer 1212 by transformation component 1213, if required for transformation component 1235.

The remaining data in buffer 1212 is then passed to the full name concatenation transformation component 1213 and the result is output to buffer 1214. As indicated by dashed line B3, this includes table 1220 including the concatenated full names and row identifiers.

At this point, the look-ahead processing is performed to determine whether fields required for the subsequent transformation component, the full name sort transformation component 1215, are present in buffer 1214 or if this transformation component is the last transformation component in the pipeline. In this case, the full name sort transformation component requires only the full name field, which is already in table 1220 in buffer 1214 (which is the input buffer to transformation component 1215). Therefore, as indicated by dashed line B4, table 1220 is unmodified within buffer 1214.

Data in buffer 1214 is then passed to the full name sort transformation component 1215, which sorts the data according to the "full name" field and passes it to output buffer 1216. Dashed line B5 indicates the table 1221 stored in buffer 1216 at this point in time.

Once again, look-ahead processing is performed to determine whether fields required for any subsequent transformation component are present in buffer 1214 or if transformation component 1215 is the last transformation component in the pipeline. Upon determining that transformation component 1215 is the last transformation component in the pipeline, the data in satellite data table 1219 is merged with table 1221 stored in buffer 1216 using the row identifier as the merge key. This patching process is indicated by dashed line B6. The target data set 1217 is then created from this merged data and includes both the satellite data fields and the sorted full names, as shown in table 1222 (indicated by dashed line B7).

Patching of satellite data can also be performed after processing by each transformation component, without requiring look-ahead processing. FIG. 12C illustrates an example of a data transformation pipeline performing data transformations on an input data set with removal of satellite data and patching of output buffers after each transformation component according to an exemplary embodiment.

As shown in FIG. 12C, a source data set 1231 is first passed to buffer 1232, which is the input buffer to a full name concatenation transformation component 1233. Source data set 1231 is initially identical to source data set 1201 in FIG. 12A. At this point, the satellite data fields corresponding to the full name concatenation transformation component 1233 are identified and removed from the buffer 1232 and replaced with a row identifier that links to the data in the removed satellite fields. This process is performed as described earlier in the specification with respect to FIGS. 1 and 7-11.

Dashed arrow C1 indicates the table 1238 that is stored in buffer 1232 at this point in the processing. As shown in table 1238, the only remaining fields (aside from the added row identifier) are the first name and last name fields, both required for the transformation performed by transformation component 1233. Additionally, dashed arrow C2 indicates the satellite data 1239 that has been removed from buffer 1232. The satellite data 1239 can be stored or maintained anywhere in memory, along with row identifiers that allow for subsequent merging with data in the output buffer 1234 after processing of the remaining data in buffer 1232 by transformation component 1233.

The remaining data in buffer 1232 is then passed to the full name concatenation transformation component 1233 and the result is output to buffer 1234. As indicated by dashed line C3, this includes table 1243 including the concatenated full names and row identifiers.

Table 1243 is then patched with the satellite data from table 1239 that was removed earlier. Tables 1243 and 1239 are therefore merged using the common row identifiers, as indicated by dashed lines C4 and C5 to create patched table 1240.

The process then moves to the next transformation component, the full name sort transformation component 1235, and removes any satellite data fields from patched table 1240 that are not required for transformation 1235. As indicated by dashed arrow C6, this results in table 1241 which contains only the full name field and the row identifier. The content of the buffer 1234 prior to processing by transformation component 1235 therefore includes table 1241, as indicated by dashed arrow C7.

Data in buffer 1234 is then passed to the full name sort transformation component 1235, which sorts the data according to the "full name" field and passes it to output buffer 1236. Dashed line C8 indicates the table 1242 stored in buffer 1236 at this point in time.

The data in satellite data table 1239 is merged with table 1242 stored in buffer 1236 using the row identifier as the merge key. This patching process is indicated by dashed line C9. The target data set 1237 is then created from this merged data and includes both the satellite data fields and the sorted full names. The resulting table is not shown but would be the same as table 1222 in FIG. 12B.

FIGS. 12A-12C involve a transformation pipeline with a second transformation which is a sorter which sorts by the full name. As explained above, the satellite data for the first concatenation transformation and the sorter transformation is detected and the output fields of expression are traversed one by one to determine their mappings to the input fields. Satellite data fields are determined by invoking the handler of each transformation component. In the sorter transformation, the input and output fields are linked by identity functions, all outputs fields are pass-through but the sort field, i.e. the column(s) on which the sort of the records is applied. In the example sort is by name field, so rest of the columns are pass-through and unnecessary for the transformation execution. This approach allows each transformation component to define the pass-through fields in an extensible way. Hence the techniques described herein can be applied to any user defined or developer developed transformation component.

Figure 13A:
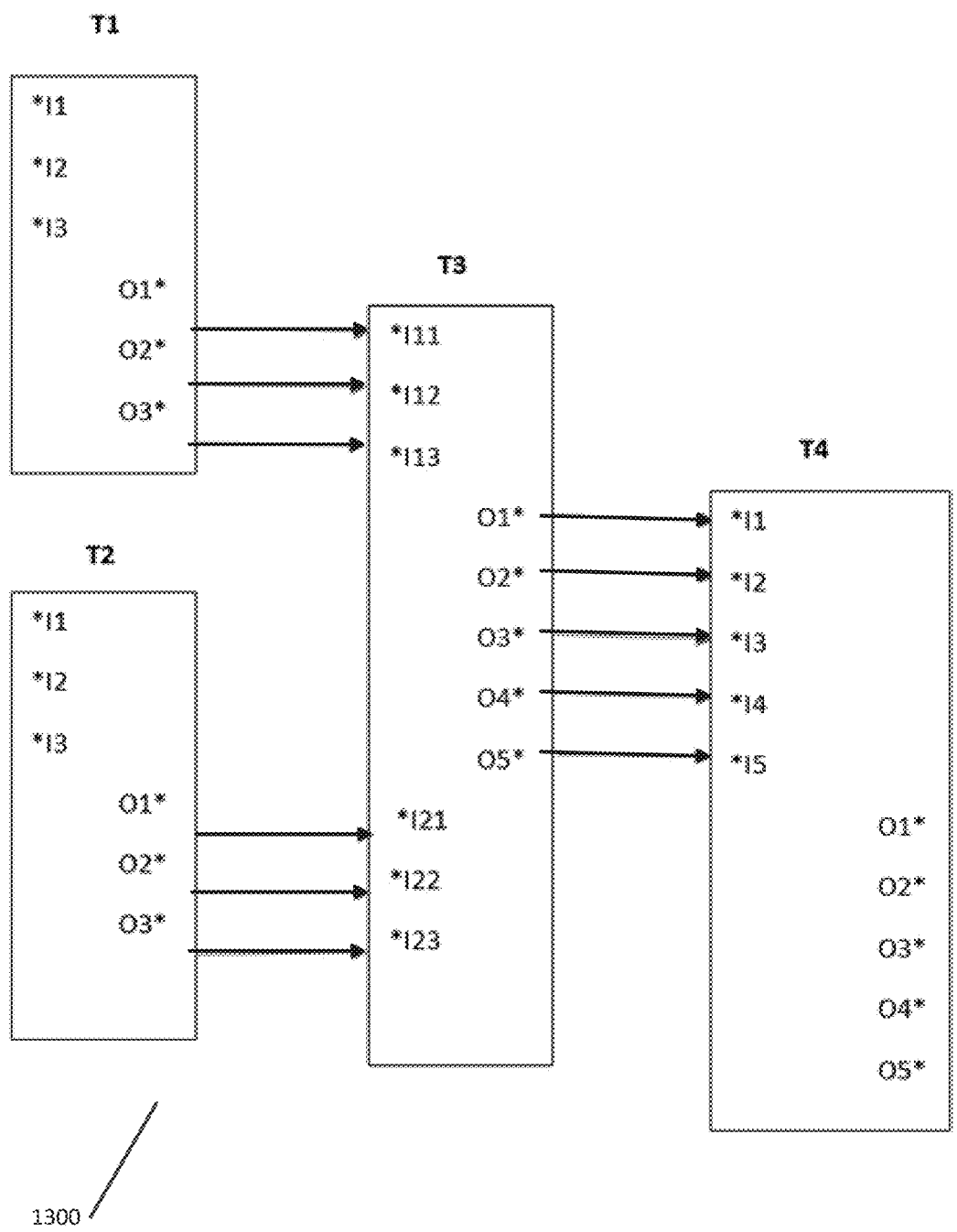
FIGS. 13A-13B illustrate merging data values corresponding to multiple groups of satellite data fields according to an exemplary embodiment.
Figure 13B:
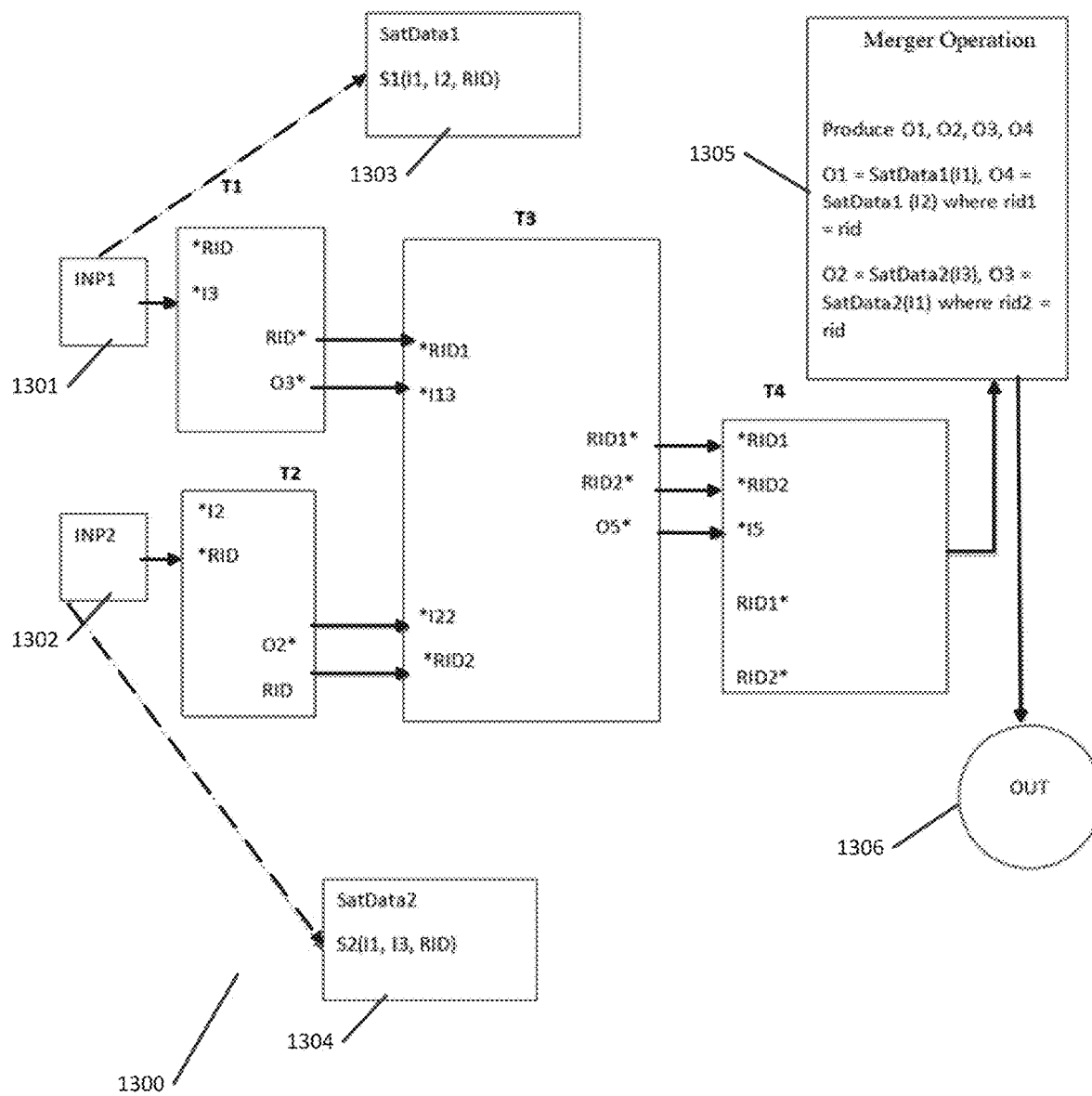

FIGS. 13A-13B illustrate merging data values corresponding to multiple groups of satellite data fields according to an exemplary embodiment. FIG. 13A illustrates a transformation pipeline 1300 with 4 transformation components, T1, T2, T3, and T4. Each of the pipelines takes one or more input fields (denoted as I1-*IN, where N is the total number of input fields) and one or more output fields (denoted as *O1-*OM, where M is the total number of output fields for the transformation component).

As discussed in greater detail below, the merging process traverses the pipeline starting from the target, processes the satellite data and merge the consecutive satellite data values.

The downstream transformation output fields are expressed in terms of the input fields of the upstream transformation. This is done by using the links between upstream and downstream field. For this example, we assume that the following pass-through (satellite) fields for each transformation component were established by applying the above-described techniques.

T1→T1(O1, I1), (O2, I2)
T2→T2(O1, I1), (O3, I3)
T3→T3 (O1, I11), (O4, I21), (O2, I23), (O3, I12)
T4→T4(O1, I1), (O3, I4), (O2, I2), (O4, I3)

So, for example, transformation component T2 has two satellite fields, I1 and I3 and transformation component T3 has four satellite fields, I11, I21, I23, and I12.

FIG. 13B illustrates the transformation pipeline 1300 after the satellite data fields 1303 and 1304 have been removed from the relevant input buffers 1301 and 1302. As shown in box 1305, merging the consecutive groups of satellite data is done by traversing the pipeline backwards. In particular:

Starting from T4, first merge the satellite field data from T4 output fields to T3 input fields. The satellite data is merged as follows:

T4 (O1)=T4(I1)
T4(I1)=T3(O1)
T3(O1)=T3(I11)
=>
T4(O1)=T3(I11).

These expressions show how the T4 output field is calculated from a T3 input field. In particular, the T4 output field O1 gets data from T4 input field I1. Additionally, the T4 input field I1 gets input from T3 output field O1. Since the T3 output field O1 gets data from T3 input field I11, then the T4 output field O1 can be transitively expressed in terms of T3 input field I11.

Similarly, the following pairs represent the T4 output fields in relation to T3 input fields:

(T4(O1), T3(I11)), (T4(O3), T3(I21)), (T4(O2), T3(I23)), (T4(O4), T3(I12))

Additionally, the following pairs represent T4 output data in terms of T1 and T2 input fields:

(T4(O1), T1(I1)), (T4(O3), T2(I1)), (T4(O2), T2(I3)), (T4(O4), T1(I2))

When merging the fields, the output of T4 is first merged with satellite fields for T3, and then merged with additional satellite data for T1 and T2.

After patching of all satellite data through the merger process 1305, the output is sent to the destination via the output port 1306.

Figure 14:
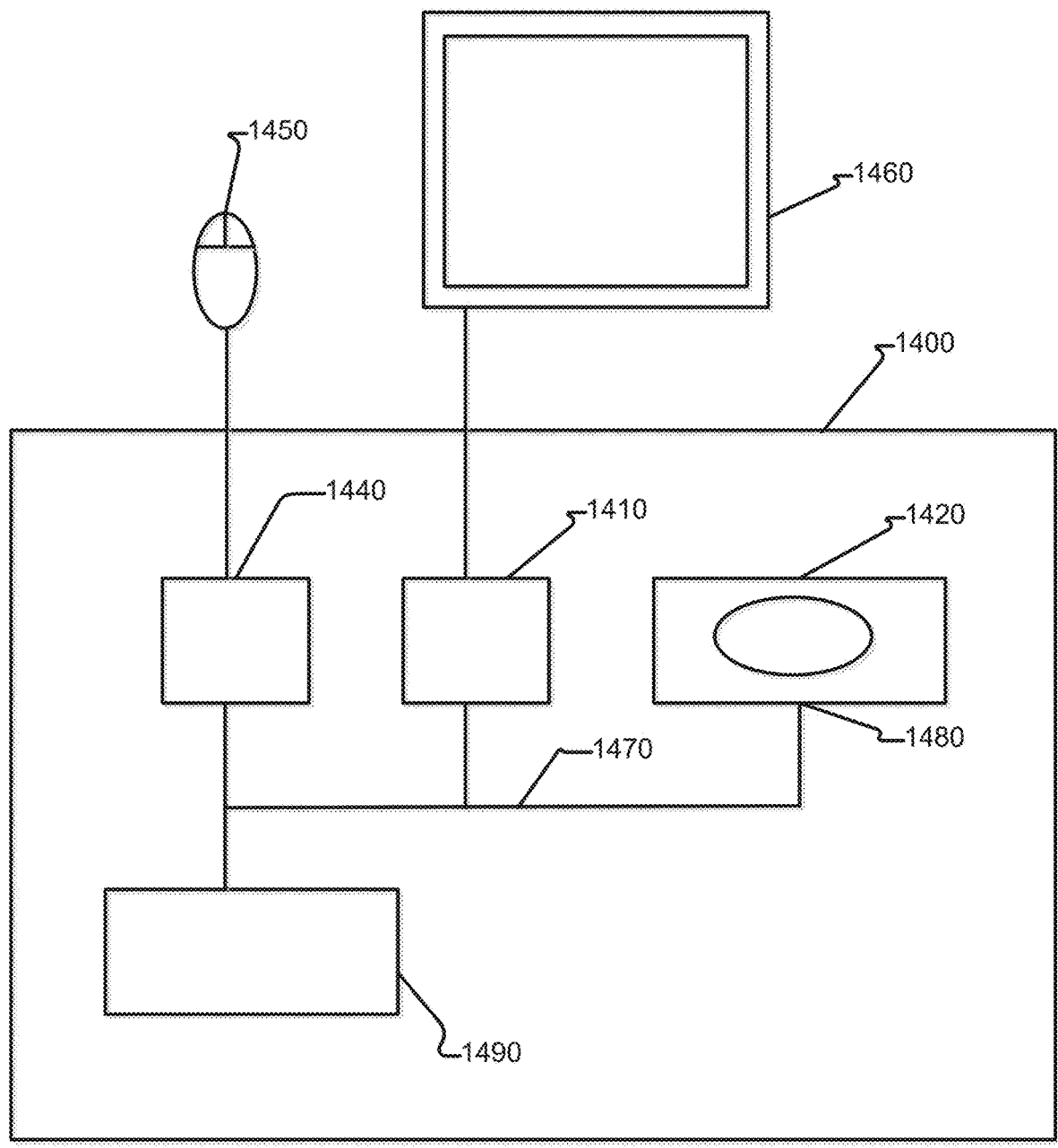
FIG. 14 illustrates an exemplary computing environment that can be used to carry out methods for data transformation pipeline optimization.

One or more of the above-described techniques can be implemented in or involve one or more special-purpose computer systems having computer-readable instructions loaded thereon that enable the computer system to implement the above-described techniques. FIG. 14 illustrates an example of a computing environment 1400. The computing environment 1400 is not intended to suggest any limitation as to scope of use or functionality of a described embodiment(s).

With reference to FIG. 14, the computing environment 1400 includes at least one processing unit 1410 and memory 1420. The processing unit 1410 executes computer-executable instructions and can be a real or a virtual processor. In a multi-processing system, multiple processing units execute computer-executable instructions to increase processing power. The memory 1420 can be volatile memory (e.g., registers, cache, RAM), non-volatile memory (e.g., ROM, EEPROM, flash memory, etc.), or some combination of the two. The memory 1420 can store software 1480 implementing described techniques.

A computing environment can have additional features. For example, the computing environment 1400 includes storage 1440, one or more input devices 1450, one or more output devices 1460, and one or more communication connections 1490. An interconnection mechanism 1470, such as a bus, controller, or network interconnects the components of the computing environment 1400. Typically, operating system software or firmware (not shown) provides an operating environment for other software executing in the computing environment 1400, and coordinates activities of the components of the computing environment 1400.

The storage 1440 can be removable or non-removable, and includes magnetic disks, magnetic tapes or cassettes, CD-ROMs, CD-RWs, DVDs, or any other medium which can be used to store information and which can be accessed within the computing environment 1400. The storage 1440 can store instructions for the software 1480.

The input device(s) 1450 can be a touch input device such as a keyboard, mouse, pen, trackball, touch screen, or game controller, a voice input device, a scanning device, a digital camera, remote control, or another device that provides input to the computing environment 1400. The output device(s) 1460 can be a display, television, monitor, printer, speaker, or another device that provides output from the computing environment 1400.

The communication connection(s) 1490 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the context of computer-readable media. Computer-readable media are any available media that can be accessed within a computing environment. By way of example, and not limitation, within the computing environment 1400, computer-readable media include memory 1420, storage 1440, communication media, and combinations of any of the above.

Of course, FIG. 14 illustrates computing environment 1700, display device 1460, and input device 1450 as separate devices for ease of identification only. Computing environment 1400, display device 1460, and input device 1450 can be separate devices (e.g., a personal computer connected by wires to a monitor and mouse), can be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing environment 1400 can be a set-top box, personal computer, or one or more servers, for example a farm of networked servers, a clustered server environment, or a cloud network of computing devices.

Having described and illustrated the principles of our invention with reference to the described embodiment, it will be recognized that the described embodiment can be modified in arrangement and detail without departing from such principles. Elements of the described embodiment shown in software can be implemented in hardware and vice versa.

In view of the many possible embodiments to which the principles of our invention can be applied, we claim as our invention all such embodiments as can come within the scope and spirit of the following claims and equivalents thereto.

We claim:

1. A method executed by a data transformation engine on one or more computing devices for data transformation pipeline optimization, the method comprising:
   storing, by the data transformation engine, a transformation pipeline comprising a plurality of data transformation components, each data transformation component having one or more associated input buffers and one or more associated output buffers and being configured to apply one or more data transformations to data in the one or more associated input buffers and output results of the one or more data transformations to the one or more associated output buffers;
   receiving, by the data transformation engine, a data set comprising a plurality of data fields;
   identifying, by the data transformation engine, one or more satellite data fields in the plurality of data fields for at least one transformation component in the plurality of transformation components, each satellite data field comprising data that is not utilized during the one or more data transformations applied by the at least one transformation component; and
   processing, by the data transformation engine, the data set through each transformation component in the transformation pipeline, the processing comprising:
      removing any satellite data fields from the one or more input buffers associated with that transformation component;
      linking the removed satellite data fields to the remaining data in the one or more input buffers by inserting one or more record identifiers of one or more records in the data set having at least one satellite data field in the one or more satellite data fields into the one or more input buffers and passing the one or more record identifiers to the one or more output buffers associated with that transformation component; and
      applying the one or more data transformations of that transformation component to remaining data in the one or more input buffers and writing a result data set to the one or more output buffers associated with that transformation component.

2. The method of claim 1, wherein at least one output buffer associated with at least one first transformation component corresponds to at least one input buffer associated with at least one second transformation component.

3. The method of claim 1, wherein the one or more data transformations comprise one or more of: a sort transformation, a concatenation transformation, a merge transformation, a join transformation, an aggregator transformation, an expression transformation, a filter transformation, a lookup transformation, a query transformation, a sequence transformation, a stored procedure transformation, an update strategy transformation, or a union transformation.

4. The method of claim 1, wherein the data set is organized in a columnar format and each data field in the plurality of data fields corresponds to a column in a plurality of columns.

5. The method of claim 1, wherein each transformation component takes one or more data fields in the plurality of data fields as one or more input groups and produces one or more output groups and wherein identifying one or more satellite data fields in the plurality of data fields for at least one transformation component in the plurality of transformation components comprises, for each transformation component:
   identifying one or more input data fields in the plurality of data fields corresponding to each input group in the one or more input groups;
   identifying one out more output data fields corresponding to each output group in the one or more output groups; and
   identifying any satellite data fields for each input group and output group pair based at least in part on the one or more input data fields corresponding to the input group and the one out more output data fields corresponding to the output group.

6. The method of claim 5, wherein identifying any satellite data fields for each input group and output group pair based at least in part on the one or more input data fields corresponding to the input group and the one out more output data fields corresponding to the output group comprises:
   identifying mappings between each output data field in the one or more output data fields and at least one input data field in the one or more input data fields;
   identifying any output data fields that depend on a single corresponding input data field based at least in part on the mappings;
   storing each of the identified output data fields with the respective corresponding input data field in one or more pairs of data fields; and
   identifying any satellite data fields by analyzing the one or more pairs of data fields to determine whether each output data field in each pair is equal to a corresponding input data field in that pair and whether the corresponding input data field is not an input data field in any other pair of data fields in the one or more pairs of data fields.

7. The method of claim 1, wherein processing the data set through each transformation component in the transformation pipeline further comprises:
   patching the one or more output buffers associated with that transformation component with either any removed satellite data fields required for any next transformation component in the transformation pipeline or all removed satellite data fields when there are no remaining transformation components in the transformation pipeline.

8. The method of claim 7, wherein patching the one or more output buffers associated with that transformation component with either any removed satellite data fields required for any next transformation component in the transformation pipeline or all removed satellite data fields when there are no remaining transformation components in the transformation pipeline comprises:
   retrieving one or more values of at least one satellite data field in the one or more satellite data fields in one or more records in the data set based at least in part on one or more record identifiers stored in the one or more output buffers; and
   merging the one or more values with one or more result records in the one or more output buffers based at least in part on the one or more record identifiers.

9. A data transformation engine for data transformation pipeline optimization, the data transformation engine comprising:
   one or more processors; and
   one or more memories operatively coupled to at least one of the one or more processors and having instructions stored thereon that, when executed by at least one of the one or more processors, cause at least one of the one or more processors to:
      store a transformation pipeline comprising a plurality of data transformation components, each data transformation component having one or more associated input buffers and one or more associated output buffers and being configured to apply one or more data transformations to data in the one or more associated input buffers and output results of the one or more data transformations to the one or more associated output buffers;
      receive a data set comprising a plurality of data fields;
      identify one or more satellite data fields in the plurality of data fields for at least one transformation component in the plurality of transformation components, each satellite data field comprising data that is not utilized during the one or more data transformations applied by the at least one transformation component; and
      process the data set through each transformation component in the transformation pipeline, the processing comprising:
         removing any satellite data fields from the one or more input buffers associated with that transformation component;
         linking the removed satellite data fields to the remaining data in the one or more input buffers by inserting one or more record identifiers of one or more records in the data set having at least one satellite data field in the one or more satellite data fields into the one or more input buffers and passing the one or more record identifiers to the one or more output buffers associated with that transformation component; and
         applying the one or more data transformations of that transformation component to remaining data in the one or more input buffers and writing a result data set to the one or more output buffers associated with that transformation component.

10. The data transformation engine of claim 9, wherein each transformation component takes one or more data fields in the plurality of data fields as one or more input groups and produces one or more output groups and wherein the instructions that, when executed by at least one of the one or more processors, cause at least one of the one or more processors to identify one or more satellite data fields in the plurality of data fields for at least one transformation component in the plurality of transformation components further cause at least one of the one or more processors to, for each transformation component:
   identify one or more input data fields in the plurality of data fields corresponding to each input group in the one or more input groups;
   identify one out more output data fields corresponding to each output group in the one or more output groups; and
   identify any satellite data fields for each input group and output group pair based at least in part on the one or more input data fields corresponding to the input group and the one out more output data fields corresponding to the output group.

11. The data transformation engine of claim 10, wherein the instructions that, when executed by at least one of the one or more processors, cause at least one of the one or more processors to identify any satellite data fields for each input group and output group pair based at least in part on the one or more input data fields corresponding to the input group and the one out more output data fields corresponding to the output group further cause at least one of the one or more processors to:
   identifying mappings between each output data field in the one or more output data fields and at least one input data field in the one or more input data fields;
   identifying any output data fields that depend on a single corresponding input data field based at least in part on the mappings;

storing each of the identified output data fields with the respective corresponding input data field in one or more pairs of data fields; and identifying any satellite data fields by analyzing the one or more pairs of data fields to determine whether each output data field in each pair is equal to a corresponding input data field in that pair and whether the corresponding input data field is not an input data field in any other pair of data fields in the one or more pairs of data fields.

12. The data transformation engine of claim 9, wherein the instructions that, when executed by at least one of the one or more processors, cause at least one of the one or more processors to process the data set through each transformation component in the transformation pipeline further cause at least one of the one or more processors to:

patch the one or more output buffers associated with that transformation component with either any removed satellite data fields required for any next transformation component in the transformation pipeline or all removed satellite data fields when there are no remaining transformation components in the transformation pipeline.

13. At least one non-transitory computer-readable medium storing computer-readable instructions that, when executed by a data transformation engine on one or more computing devices, cause the data transformation engine to:

store a transformation pipeline comprising a plurality of data transformation components, each data transformation component having one or more associated input buffers and one or more associated output buffers and being configured to apply one or more data transformations to data in the one or more associated input buffers and output results of the one or more data transformations to the one or more associated output buffers;

receive a data set comprising a plurality of data fields;

identify one or more satellite data fields in the plurality of data fields for at least one transformation component in the plurality of transformation components, each satellite data field comprising data that is not utilized during the one or more data transformations applied by the at least one transformation component; and process the data set through each transformation component in the transformation pipeline, the processing comprising:

removing any satellite data fields from the one or more input buffers associated with that transformation component;

linking the removed satellite data fields to the remaining data in the one or more input buffers by inserting one or more record identifiers of one or more records in the data set having at least one satellite data field in the one or more satellite data fields into the one or more input buffers and passing the one or more record identifiers to the one or more output buffers associated with that transformation component; and applying the one or more data transformations of that transformation component to remaining data in the one or more input buffers and writing a result data set to the one or more output buffers associated with that transformation component.

14. The at least one non-transitory computer-readable medium of claim 13, wherein each transformation component takes one or more data fields in the plurality of data fields as one or more input groups and produces one or more output groups and wherein the instructions that, when executed by the data transformation engine, cause the data transformation engine to identify one or more satellite data fields in the plurality of data fields for at least one transformation component in the plurality of transformation components further cause the data transformation engine to, for each transformation component:

identify one or more input data fields in the plurality of data fields corresponding to each input group in the one or more input groups;

identify one out more output data fields corresponding to each output group in the one or more output groups; and identify any satellite data fields for each input group and output group pair based at least in part on the one or more input data fields corresponding to the input group and the one out more output data fields corresponding to the output group.

15. The at least one non-transitory computer-readable medium of claim 14, wherein the instructions that, when executed by the data transformation engine, cause the data transformation engine to identify any satellite data fields for each input group and output group pair based at least in part on the one or more input data fields corresponding to the input group and the one out more output data fields corresponding to the output group further cause the data transformation engine to:

identifying mappings between each output data field in the one or more output data fields and at least one input data field in the one or more input data fields;

identifying any output data fields that depend on a single corresponding input data field based at least in part on the mappings;

storing each of the identified output data fields with the respective corresponding input data field in one or more pairs of data fields; and identifying any satellite data fields by analyzing the one or more pairs of data fields to determine whether each output data field in each pair is equal to a corresponding input data field in that pair and whether the corresponding input data field is not an input data field in any other pair of data fields in the one or more pairs of data fields.

16. The at least one non-transitory computer-readable medium of claim 13, wherein the instructions that, when executed by the data transformation engine, cause the data transformation engine to process the data set through each transformation component in the transformation pipeline further cause the data transformation engine to:

patch the one or more output buffers associated with that transformation component with either any removed satellite data fields required for any next transformation component in the transformation pipeline or all removed satellite data fields when there are no remaining transformation components in the transformation pipeline.

17. A method executed by a data transformation engine on one or more computing devices for data transformation pipeline optimization, the method comprising:

storing, by the data transformation engine, a transformation pipeline comprising a plurality of data transformation components, each data transformation component having one or more associated input buffers and one or more associated output buffers and being configured to apply one or more data transformations to data in the one or more associated input buffers and output results of the one or more data transformations to the one or more associated output buffers;

receiving, by the data transformation engine, a data set comprising a plurality of data fields, each transformation component taking one or more data fields in the plurality of data fields as one or more input groups and producing one or more output groups;

identifying, by the data transformation engine, one or more satellite data fields in the plurality of data fields for at least one transformation component in the plurality of transformation components by identifying one or more input data fields corresponding to each input group and one or more output data fields corresponding to each output group and identifying any satellite data fields for each input group and output group pair based at least in part on the one or more input data fields corresponding to that input group and the one or more output data fields corresponding to that output group, each satellite data field comprising data that is not utilized during the one or more data transformations applied by the at least one transformation component; and processing, by the data transformation engine, the data set through each transformation component in the transformation pipeline, the processing comprising:
removing any satellite data fields from the one or more input buffers associated with that transformation component;
linking the removed satellite data fields to the remaining data in the one or more input buffers; and
applying the one or more data transformations of that transformation component to remaining data in the one or more input buffers and writing a result data set to the one or more output buffers associated with that transformation component.

18. A data transformation engine for data transformation pipeline optimization, the data transformation engine comprising:
one or more processors; and
one or more memories operatively coupled to at least one of the one or more processors and having instructions stored thereon that, when executed by at least one of the one or more processors, cause at least one of the one or more processors to:
store a transformation pipeline comprising a plurality of data transformation components, each data transformation component having one or more associated input buffers and one or more associated output buffers and being configured to apply one or more data transformations to data in the one or more associated input buffers and output results of the one or more data transformations to the one or more associated output buffers;
receive a data set comprising a plurality of data fields, each transformation component taking one or more data fields in the plurality of data fields as one or more input groups and producing one or more output groups;
identify one or more satellite data fields in the plurality of data fields for at least one transformation component in the plurality of transformation components by identifying one or more input data fields corresponding to each input group and one or more output data fields corresponding to each output group and identifying any satellite data fields for each input group and output group pair based at least in part on the one or more input data fields corresponding to that input group and the one or more output data fields corresponding to that output group, each satellite data field comprising data that is not utilized during the one or more data transformations applied by the at least one transformation component; and
process the data set through each transformation component in the transformation pipeline, the processing comprising:
removing any satellite data fields from the one or more input buffers associated with that transformation component;
linking the removed satellite data fields to the remaining data in the one or more input buffers; and
applying the one or more data transformations of that transformation component to remaining data in the one or more input buffers and writing a result data set to the one or more output buffers associated with that transformation component.

19. At least one non-transitory computer-readable medium storing computer-readable instructions that, when executed by a data transformation engine on one or more computing devices, cause the data transformation engine to:
store a transformation pipeline comprising a plurality of data transformation components, each data transformation component having one or more associated input buffers and one or more associated output buffers and being configured to apply one or more data transformations to data in the one or more associated input buffers and output results of the one or more data transformations to the one or more associated output buffers;
receive a data set comprising a plurality of data fields, each transformation component taking one or more data fields in the plurality of data fields as one or more input groups and producing one or more output groups;
identify one or more satellite data fields in the plurality of data fields for at least one transformation component in the plurality of transformation components by identifying one or more input data fields corresponding to each input group and one or more output data fields corresponding to each output group and identifying any satellite data fields for each input group and output group pair based at least in part on the one or more input data fields corresponding to that input group and the one or more output data fields corresponding to that output group, each satellite data field comprising data that is not utilized during the one or more data transformations applied by the at least one transformation component; and
process the data set through each transformation component in the transformation pipeline, the processing comprising:
removing any satellite data fields from the one or more input buffers associated with that transformation component;
linking the removed satellite data fields to the remaining data in the one or more input buffers; and
applying the one or more data transformations of that transformation component to remaining data in the one or more input buffers and writing a result data set to the one or more output buffers associated with that transformation component.

* * * * *